(12) United States Patent
Kulkarni et al.

(10) Patent No.: US 7,924,702 B2
(45) Date of Patent: Apr. 12, 2011

(54) METHOD FOR RECONFIGURING A COMMUNICATION NETWORK

(75) Inventors: Vivek Kulkarni, Unterhaching (DE); Elie Sfeir, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/311,388

(22) PCT Filed: Sep. 24, 2007

(86) PCT No.: PCT/EP2007/060080
§ 371 (c)(1),
(2), (4) Date: Dec. 11, 2009

(87) PCT Pub. No.: WO2008/037679
PCT Pub. Date: Apr. 3, 2008

(65) Prior Publication Data
US 2010/0110880 A1    May 6, 2010

(30) Foreign Application Priority Data

Sep. 28, 2006  (EP) ..................................... 06020452
Mar. 29, 2007  (DE) ........................ 10 2007 015 226

(51) Int. Cl.
*H04L 12/24* (2006.01)
*H04J 3/24* (2006.01)
*G06F 11/07* (2006.01)

(52) U.S. Cl. ...................... 370/216; 370/256; 370/401

(58) Field of Classification Search .................. None
See application file for complete search history.

(56) References Cited

U.S. PATENT DOCUMENTS

| | | | |
|---|---|---|---|
| 5,260,945 A | 11/1993 | Rodeheffer | |
| 6,219,739 B1 * | 4/2001 | Dutt et al. | 710/311 |
| 7,154,861 B1 * | 12/2006 | Merchant et al. | 370/254 |
| 7,471,647 B2 * | 12/2008 | Ge et al. | 370/256 |
| 7,518,988 B2 * | 4/2009 | Sekihata | 370/222 |
| 7,715,379 B2 * | 5/2010 | Gonda | 370/389 |
| 7,760,668 B1 * | 7/2010 | Zinjuvadia | 370/256 |
| 2001/0021177 A1 | 9/2001 | Ishii | |

(Continued)

FOREIGN PATENT DOCUMENTS

| | | |
|---|---|---|
| EP | 0404423 A2 | 12/1990 |
| EP | 1722518 A1 | 11/2006 |

OTHER PUBLICATIONS

Standard IEEE 802.1d, 2004, Media Access Control (MAC) Bridges.

(Continued)

*Primary Examiner* — Chi H Pham
*Assistant Examiner* — Soon-Dong D Hyun

(57) ABSTRACT

A method for reconfiguring a packet-switched communication network using a network protocol for installing a logic topology of the network formed as a spanning tree is disclosed. The method includes detecting failure of a direct link to a root bridge of the spanning tree by a first bridge; detecting the failure of a direct link to the root bridge by a second bridge; transmitting a first configuration frame generated by the first bridge to other bridges; receiving the first configuration frame by a third bridge and transmitting a second configuration frame, generated by the third bridge, to the other bridges; detecting the first or second configuration frame by the second bridge and transmitting the third configuration frame generated by the second bridge to the other bridges; receiving the third configuration frame by the other bridges of the network and triggering a reconfiguration of the network with detection of a new spanning tree by the network protocol.

13 Claims, 5 Drawing Sheets

U.S. PATENT DOCUMENTS

2004/0081083 A1* 4/2004 Sekihata ............... 370/222
2005/0044211 A1   2/2005 Adhikari
2007/0086361 A1* 4/2007 Allan et al. ............ 370/254
2009/0323518 A1* 12/2009 Rose et al. ............ 370/223

OTHER PUBLICATIONS

Standard IEEE 802.1w, 2001, "Part 3: Media Access Control (MAC) Bridges Amendment 2: Rapid Reconfiguration".

Standard IEEE 802.1s, 2002, "Virtual Bridged Local Area Networks-Amendment 3: Multiple Spanning Trees".

Sfeir et al., "Performance Evaluation of Ethernet Resilience Mechanisms", 2005 Workshop on High Performance Switching and Routing, IEEE, 2005, pp. 356-360.

Umayabashi et al., "Improving Ethernet Reliability and Stability Using Global Open Ethernet Technology"(IEICE Transactions on Communications 2006, pp. 675-682, vol. E89-B, No. 3.

* cited by examiner

METHOD FOR RECONFIGURING A COMMUNICATION NETWORK

CROSS REFERENCE TO RELATED APPLICATIONS

This application is the US National Stage of International Application No. PCT/EP2007/060080 filed Sep. 24, 2007 and claims the benefit thereof. The International Application claims the benefits of European Patent Application No. 06020452.6 EP filed Sep. 28, 2006 and German Patent Application No. 10 2007 015 226.6 EP filed Mar. 29, 2007, all of the applications are incorporated by reference herein in their entirety.

FIELD OF INVENTION

The invention is in the technical field of packet-switched communication networks, and relates to a method for reconfiguring a communication network with a logical topology in the form of a spanning tree.

BACKGROUND OF INVENTION

It is possible to link with each other several packet-switched networks (LAN=Local Area Network) or segments of the one and same LAN via "intelligent" bridges or multi-port bridges (switches). When this is done, the bridges can autonomously detect the logical topology of the network by means of the data packets (data frames) passing through them, by using the layer 2 addresses of the bridges in the network (MAC addresses, MAC=Medium Access Control).

In a switched network there should only ever be one single network path which is active for the exchange of data between two bridges, because if there are path loops it is possible for data packets to be duplicated, which is unwanted, and for multiple copies to be forwarded to the destination, which can lead to malfunctions and reduces the performance of the communication network.

IEEE Standard 802.1d establishes a standard for a network protocol called STP (STP=Spanning Tree Protocol), by which a logical topology is set up, in the form of a loop-free spanning tree, which links together the bridges of the communication network. During the setting up of the spanning tree, no payload data (subscriber data) can be transmitted.

In STP, identifiers are issued for all the bridges in the network (bridge IDs), consisting in each case of the layer 2 address (MAC address) of the bridge and a priority field. In the same way, each connection (port) is assigned an identifier (port ID) and a path cost.

In STP, the ports can assume different states, namely a "blocking" state in which only configuration frames, called BPDUs (BPDU=Bridge Protocol Data Unit), are accepted by the bridges, a "listening" state, during which the active logical topology is mapped, a "learning" state during which a bridging table is compiled from the MAC addresses which have been read, a "forwarding" state in which the ports are to forward payload data, and a "disabled" state in which ports neither receive nor forward either payload data or BPDUs.

In STP, only the root bridge creates BPDUs, whereas the other bridges do not themselves create any BPDUs, but only forward (relay) BPDUs received from the root bridge. With the help of the data items contained in the BPDUs, the bridges can alter the states of their ports.

Each BPDU contains a series of fields, such as a flag field for indicating or confirming a topology change, a root bridge ID field for identifying the root bridge with details of its priority and ID, a path cost field for specifying the path costs of the root bridge which is transmitting the BPDU, a message age field (MessAge) for specifying the length of time since the BPDU was sent out, a MaxAge field for specifying an interval of time, after the expiry of which the message is to be deleted, a hello time field for specifying the time interval between regular configuration messages from the root bridge, and a forward delay field, which specifies the time to wait after a change to the topology.

In order to form a loop-free logical topology, STP uses four criteria for the purpose of determining the highest priorities of the bridges, or their ports, as applicable. They are: the smallest root bridge ID, the lowest path cost for a root bridge, the smallest transmission bridge ID, and the smallest port ID.

In order to determine a root bridge, in STP all the ports of the bridges go into the "blocking" state after the initialization (for example after a restart of the network), whereby each bridge initially assumes that it is itself a root bridge and transmits to the other bridges an appropriate BPDU, with its own ID as the root bridge ID. After this, the bridge with the lowest root bridge ID is selected as the root bridge. In the event of identical root bridge IDs, the lowest MAC address is used as a supplementary criterion.

After this, all the network paths of the spanning tree over which a data exchange is to take place between the bridges in the communication network are defined, from the selected root bridge outward. For this purpose, the root bridge first transmits BPDUs to the other bridges. Each bridge thereupon determines as its root port that port which has the lowest path cost to the root bridge. In the event that there are path costs which are the same, the port ID is used as a supplementary criterion. Then, on the basis of the path costs, designated ports are determined and the designated bridges in the spanning tree are determined.

In STP, the root bridge informs all the bridges in the spanning tree at regular intervals that it is still there, by means of a BPDU (hello signal). If such a hello signal does not appear, such as because of the failure of a link or the root bridge itself, a reconfiguration (reconvergence) of the communication network is required to determine a new spanning tree, which in STP typically takes at least 30 seconds. During this time only BPDUs, i.e. data packets for the purpose of determining a new spanning tree, are communicated, so that for this period of time the communication network cannot be used for payload data exchange.

Faster reconvergence of the communication network is made possible by the RSTP network protocol (RSTP=Rapid Spanning Tree Protocol), which is standardized in the IEEE Standard 802.1w. In RSTP, alternative ports are determined, which block BPDUs from other bridges and offer an alternative path to the root bridge if the root port should go down. In addition, a proposal/agreement handshake mechanism has been implemented in RSTP.

Whereas STP bridges which are not root bridges will only forward BPDUs if they themselves have beforehand obtained a BPDU from the root bridge, in RSTP bridges themselves also transmit BPDUs at time intervals which can be defined. RSTP specifies that a bridge will lose its link to a neighboring bridge if it cannot receive three BPDUs within this definable time interval. This enables the failure of a link to be recognized more rapidly than in STP. As shown by simulations, the convergence time in RSTP is a few seconds, for example approx. 2 seconds when a link fails and approx. 7 seconds when a root bridge fails.

SUMMARY OF INVENTION

Although, by comparison with STP, RSTP permits a significant shortening of the down time during reconvergence of a communication network, an even shorter down time would be desirable, in particular when a root bridge fails, in order to meet the quality of service characteristics which are demanded.

An object of the present invention is to provide a method for reconfiguring a packet-switched communication network with a logical topology in the form of a spanning tree with which, when a root bridge goes down, the down time until the spanning tree is recreated can be reduced.

This object is achieved in accordance with the invention by a method for reconfiguring a packet-switched communication network as claimed in the independent claim. Advantageous embodiments of the invention are specified by the characteristics of the dependent claims.

For the purpose of achieving the object, a method is indicated for reconfiguring a packet-switched communication network after the failure of a root bridge. The network incorporates a plurality of bridges which are linked to each other via data links for the purpose of exchanging data packets (frames). Here and in what follows, the network nodes in the network will be referred to as "bridges". In the sense meant by the invention, these can equally well be switches (multiport bridges) or other network nodes suitable for switching. Each of the bridges and their ports are identified by an identifier (bridge ID, port ID).

The network uses a proprietary network protocol, which is capable of setting up in the network a logical topology, in the form of a spanning tree, for data exchange purposes. This network protocol is based, for example, on the Spanning Tree Protocol (SPT) as per IEEE Standard 802.1d, and preferably based on the Rapid Spanning Tree Protocol (RSPT) as per IEEE Standard 802.1w or the Multiple Spanning Tree Protocol (MSTP) as per IEEE Standard 802.1s.

Starting with a network with a spanning tree which has been set up and which contains a root bridge and designated bridges, which are linked via active data links to the root bridge for the purpose of exchanging data packets, the method incorporates the following steps for when a root bridge in the spanning tree fails:

Detection of the failure of a direct link to the root bridge of the spanning tree, by a first bridge which is directly connected to the root bridge via this link and which has no alternative ports which can be used instead of the root port as alternative root ports. At the same time as the failure of the direct link to the root bridge is detected, a timer is started.

Detection of the failure of a direct link to the root bridge, by at least one second bridge which is directly connected to the root bridge via this link and which has at least one alternative port which can be used instead of the root port as an alternative root port. Such detection takes place within a selectable interval of time on the timer started by the first bridge. For example, the selectable time on the timer could be a maximum of 10 milliseconds. In addition, in the second bridge the alternative port is defined as the new root port.

Transmission to the other bridges in the network of first configuration frames (RSTP BPDUs) generated by the first bridge. For this purpose, the first configuration frames are transmitted to those bridges which are directly connected to the first bridge, from which they are forwarded as necessary. The first configuration frame contains as its origin identifier (root bridge ID) the ID of the first bridge. The first bridge thereby declares itself to the other bridges as the new root bridge.

Receipt of the first configuration frame by at least one third bridge, which has no direct link to the root bridge, i.e. no ports with the "linked to root" flag set (see below). The receipt of the first configuration frame initiates the transmission to the other bridges in the network of the second configuration frame, generated by the third bride. For this purpose, the second configuration frames are transmitted to those bridges which are directly connected to the third bridge, from which they are forwarded as necessary.

The second configuration frame, here referred to as the RFN BPDU (RFN=Root Failure Notification), incorporates the following fields:
i) Type: set to RFN BPDU;
ii) Root bridge ID: set to the ID of the root bridge which has failed;
iii) Originating bridge ID: set to the ID of the bridge which was the first to send this RFN BPDU; this field will not be altered by the bridges which forward the RFN BPDU; the bridge ID of the third bridge will be entered here,
iv) Root link failure flag: this is used to distinguish between the failure of a link which is directly connected to the root bridge and a failure of the root bridge itself; here it is set.

Thus, in the first RFN BPDU the flag which indicates a failure of the direct link from the first bridge to the root bridge is set, and as the originating bridge ID it contains the identifier of the third bridge. The first RFN BPDU is intended to inform all the other bridges that the first bridge, which is announcing itself as the new root bridge, has lost its direct connection to the old root bridge. This notification does not necessarily imply that the old root bridge actually has failed. It could be merely the link to the root bridge which has failed.

Detection of the first configuration frame (RSTP BPDU) or the second configuration frame (first RFN BPDU) by the second bridge, this being a bridge with a direct connection to the (old) root bridge, i.e. which has at least one port for which the "connected to root" flag (see below) is set and which has already failed due to the failure of the root bridge. This initiates the transmission to the other bridges in the network of a third configuration frame, generated by the second bridge. For this purpose, the third configuration frames are transmitted to the bridges which are directly connected to the second bridge, which forward them as necessary.

The third configuration frame, here referred to as the second RFN BPDU, has the same type fields as the first RFN BPDU. It thus incorporates the following fields:
i) Type: set to RFN BPDU;
ii) Root bridge ID: set to the bridge ID of the root bridge which has failed;
iii) Originating bridge ID: set to the bridge ID of the second bridge;
iv) Root link failure flag: cleared.

Thus, in the second RFN BPDU the flag which indicates a failure of the direct link from the first bridge to the root bridge is cleared, and as the originating bridge ID it contains the identifier of the second bridge. The second RFN BPDU is intended to inform the other bridges that the root bridge has failed, on the basis of the assumption that the second bridge has received an RFN BPDU from another bridge (the first bridge) which has also lost its direct connection to the root bridge.

Detection of the third configuration frame (second RSTP BPDU) by the bridges in the network and the initiation of the reconfiguration (setting up of a new spanning tree) in the communication network by means of the network protocol. In this process, each bridge clears the states of its ports, and if necessary carries out a restart, in order to initiate the selection of a new root bridge and the subsequent determination of designated bridges.

In the communication network, each bridge monitors each port which is directly connected to the root bridge, by monitoring configuration frames (BPDUs) received at the port from the root bridge. In point-to-point connections, each port which receives a BPDU in which the transmitting bridge ID is identical to the root bridge ID is a root port. For the purpose of identifying it as a root port, a "connected to root" flag is set for each such port. This is checked for every BPDU which is received.

In the communication network, the items of data contained in an RFN BPDU it receives are stored in each bridge. The stored data from an RFN BPDU is compared with the data in any RFN BPDU which is subsequently received. If the data is redundant, no action is taken and the RFN BPDU which was received is not forwarded. Otherwise, the RNF BPDU is processed and forwarded. A bridge which receives a first RFN BPDU with its "connected to root" flag set will thus process this first RFN BPDU and forward it unaltered to its other ports only if the data contained in the first RFN BPDU which was received is not redundant. A bridge which receives a second RFN BPDU with the "connected to root" flag cleared will thus process it and forward it unaltered to its other ports only if the data contained in the second RFN BPDU which was received is not redundant.

In the method, if at least two direct links to the root bridge fail within the selectable interval of time on the first timer, the setting up of a new spanning tree is initiated, omitting the root bridge which is assumed to have failed. However, this does not necessarily imply that the old root bridge actually has failed.

In the method it is therefore advantageous if a configuration frame (BPDU) transmitted by the original root bridge is not processed by the other bridges in the network within a selectable interval of time on the timer. In this case, after the selectable interval of time on the timer has expired, a BPDU from the original root bridge initiates the selection of the original root bridge as the new root bridge and the setting up of a new spanning tree by means of the network protocol. This will delay the convergence time of the network by the interval of time on the timer. Because this situation is rather unlikely, a time interval of approx. 100 milliseconds is acceptable.

By the method described above, it is advantageously possible to achieve rapid reconfiguration of a logical topology for a packet-switched communication network, in the form of a spanning tree, after a root bridge has failed. A further advantage of the method lies in the fact that if the old root bridge is restored, it is possible to effect a very rapid reconfiguration, including the old root bridge.

The invention extends further to cover a packet-switched communication network with a plurality of bridges which are connected with each other via data links for the purpose of exchanging data packets. Here, the bridges are set up in such a way that they can carry out a method like that described above. Such a communication network advantageously permits a rapid reconfiguration of a logical topology in the form of a spanning tree after the failure of a root bridge, and a rapid reconfiguration after the restoration of the root bridge.

Furthermore, the invention extends to cover a bridge, in a packet-switched communication network such as is described above, having an electronic data processing facility which is set up so that the bridge can carry out a method as described above. Such a bridge permits a rapid reconfiguration of a logical topology in the form of a spanning tree after the failure of a root bridge, and a rapid reconfiguration after the restoration of the root bridge.

The invention extends further to cover a machine-readable program code for the electronic data processing facility in such a bridge, containing control instructions which cause the data processing facility to carry out a method as described above. In addition, the invention extends to cover a storage medium with such a machine-readable program code stored on it.

BRIEF DESCRIPTION OF THE DRAWINGS

The invention will now be explained in more detail by reference to an exemplary embodiment, whereby reference is made to the attached drawings. These show.

DETAILED DESCRIPTION OF INVENTION

Figure 1A:
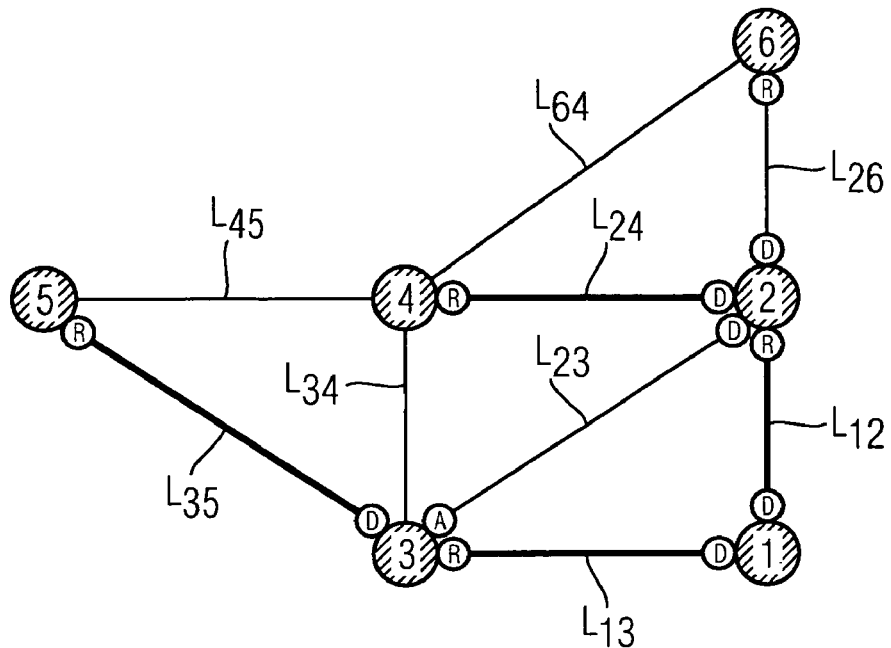
FIG. 1A-1E schematically, an exemplary embodiment of the communication network to illustrate an exemplary embodiment of the method.

Reference will now be made to FIGS. 1A-1E, in which is shown in schematic form an exemplary embodiment of the communication network to illustrate an exemplary embodiment of the method.

The physical topology of the communication network incorporates a plurality of bridges, 1 to 6, each of which has a plurality of ports through which the bridges are connected to each other by means of (data) links L. Thus, bridge 1 is connected via a link $L_{12}$ with bridge 2 and via a link $L_{13}$ with bridge 3. Bridge 2 is connected via a link $L_{26}$ with bridge 6, via a link $L_{24}$ with bridge 4 and via a link $L_{23}$ with bridge 3. Bridge 3 is connected via link $L_{13}$ with bridge 1, via link $L_{23}$ with bridge 2 and via a link $L_{35}$ with bridge 5. Bridge 4 is connected via a link $L_{34}$ with bridge 3, via link $L_{24}$ with bridge 2, via a link $L_{64}$ with bridge 6 and via a link $L_{45}$ with bridge 5. Bridge 5 is connected via link $L_{45}$ with bridge 4 and via link $L_{35}$ with bridge 3. Bridge 6 is connected via link $L_{26}$ with bridge 2 and via a link $L_{64}$ with bridge 4. All the links are point-to-point connections and connect the bridges bidirectionally.

Each of the bridges 1-6 has electronic control facilities, which are appropriately set up for executing the relevant functions of the proprietary network protocol. The network protocol is based on RSTP and is capable of setting up a logical topology in the form of a spanning tree. Here, unique identifiers and path costs are assigned to all the bridges and ports in the network.

The bridges are set up in such a way that they can generate and forward first configuration frames (RSTP BPDUs) in accordance with the RSTP, proprietary second configuration frames (first RFN BPDUs) and proprietary third configuration frames (second RFN BPDUs), with type fields as described above.

FIG. 1A shows a first stable state of the network in which a first spanning tree, containing all the bridges of the network, is set up. The first spanning tree is shown by the thick lines within the physical topology of the network.

In the first spanning tree, bridge 1 serves as the root bridge. The first spanning tree incorporates the links $L_{12}$ and $L_{13}$ for connecting the root bridge 1 with the bridges 2 and 3, where the link $L_{12}$ connects together the designated port D of root bridge 1 and the root port R of bridge 2, and the link $L_{13}$ connects together the designated port D of root bridge 1 and the root port R of bridge 3. The first spanning tree incorporates in addition the links $L_{26}$ and $L_{24}$, for connecting bridge 2 with bridges 6 and 4, where link $L_{26}$ connects together the designated port D of bridge 2 and the root port R of bridge 6, and the link $L_{24}$ connects together the designated port D of bridge 2 and the root port R of bridge 4. It incorporates in addition the link $L_{35}$ for connecting bridge 3 with bridge 5, where the link $L_{35}$ connects together the designated port D of bridge 3 and the root port R of bridge 5.

Data packets, in the form of payload data and configuration frames, can be exchanged over the first spanning tree between all the bridges 1-6 of the communication network.

Figure 1B:
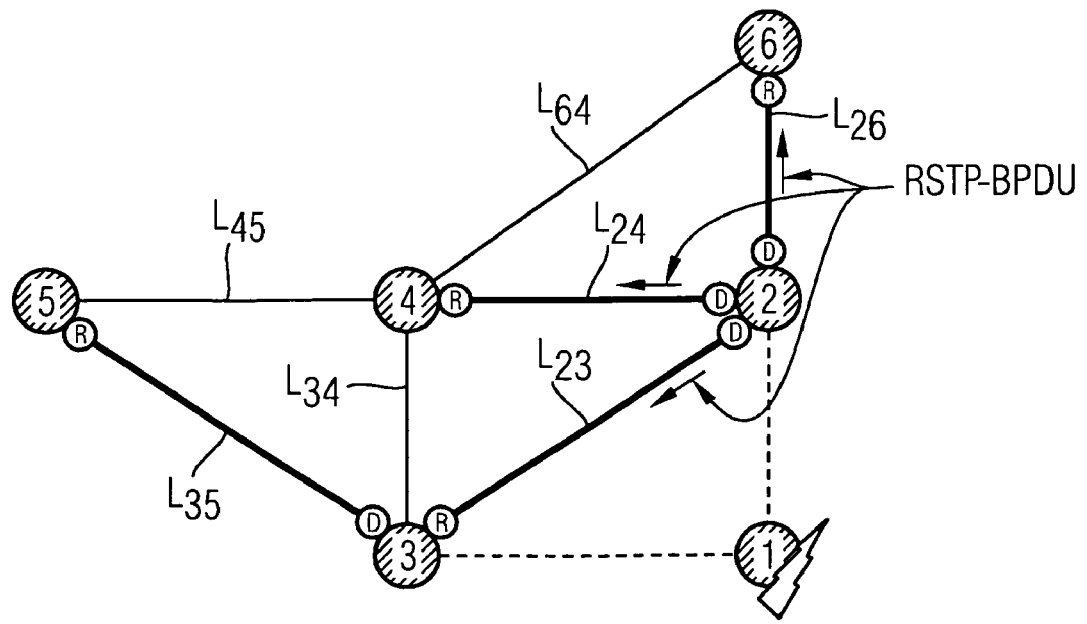

FIG. 1B shows a transition state of the communication network, immediately after a failure of the root bridge 1. The failure of the root bridge 1 is indicated by the lightning symbol. In addition, the two links $L_{12}$ and $L_{13}$, which connect the root bridge 1 with the immediately adjacent bridges 2 and 3, are shown as dashed lines, to indicate that at their root ports R the two immediately adjacent bridges 2, 3 no longer have a connection to the root bridge 1.

In the root ports R of the bridges 2, 3 immediately adjacent to the root bridge 1, "connected to root" flags are set as an indication that they are root ports. The "connected to root" flag is set if a BPDU is received from the root bridge 1 in which the transmitting bridge ID is identical to the root bridge ID. This is checked by bridges 2 and 3 for every BPDU received from the root bridge 1.

At regular intervals of time, the root bridge 1 transmits BPDUs (hello signals) to the designated bridges in the first spanning tree. If root bridge 1 fails, the two bridges 2 and 3 which are adjacent to the root bridge 1 each detect the failure of the root bridge 1 at their root ports R, because the BPDU from the root bridge 1 is no longer received. Equally, it is possible that the failure is detected by hardware, i.e. the absence of an electrical signal, which can be effected practically instantaneously.

Bridge 2 is directly connected to root bridge 1 via the link $L_{12}$. Bridge 2 has no alternative port A which could be used as an alternative root port in the event of a failure of the root port R. As soon as the failure of the link $L_{12}$ to root bridge 1 due to failure of the root port R is detected, bridge 2 declares itself as the new root bridge, in that it generates first configuration frames configured in RSTP (RSTP BPDUs), and emits them via all its functioning ports and the links $L_{23}$, $L_{24}$ and $L_{26}$ to the neighboring bridges 3, 4 and 6. The RSTP BPDUs will if necessary be forwarded by the other bridges in the network.

In the RSTP BPDUs, bridge 2 is specified as the (new) root bridge, in that its bridge ID is entered in the type field for the root bridge ID. This corresponds to the normal RSTP behavior. In addition, a timer is started. The timer signal is contained in the RSTP BPDU.

Bridge 3 is directly connected to the root bridge 1 via the link $L_{13}$. Bridge 3 has available an alternative port A, which could be used as an alternative root port in the event of a failure of the root port R. As soon as a failure of the root bridge 1 has been detected, bridge 3 changes the state of its alternative port A to a state as root port R. This corresponds to the normal RSTP behavior.

Figure 1C:
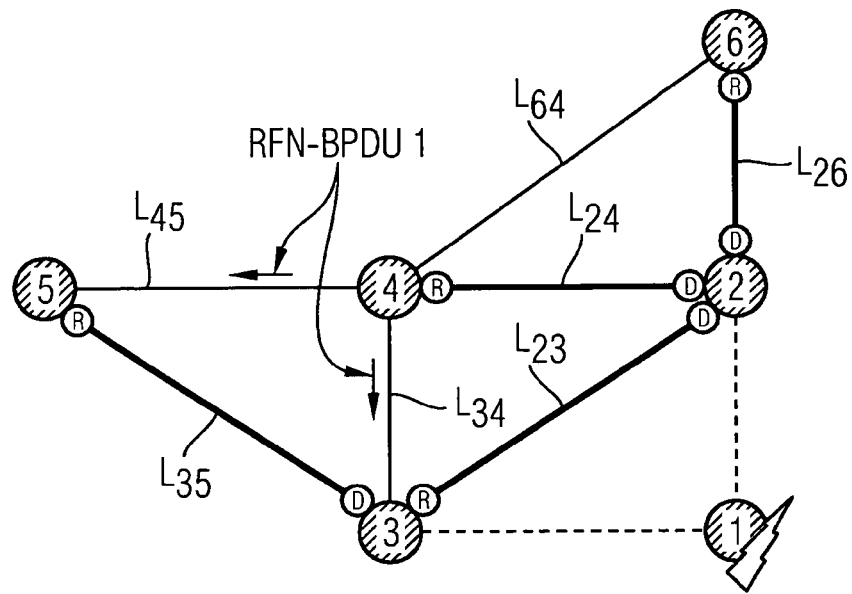

FIG. 1C shows another temporary state of the communication network, in which the bridge 4 which is closest in path-cost terms to bridge 2 has already received and processed the RSTP BDPU from bridge 2 over the link $L_{24}$. Bridge 4 thereupon generates and transmits through all its ports, except for the port at which it received the RSTP BPDU, a proprietary second configuration frame, namely a first RFN BPDU (RFN BPDU 1). The first RFN BPDU is received and processed by the other bridges in the network. In addition, the data items contained in the first RFN BPDU are stored in the bridges. If another first RFN BPDU is received from one and the same bridge, the items of data contained in the first RFN BPDU which was received later are compared with the stored data from the RFN BPDU which was received earlier. The receiving bridge will forward the first RFN BPDU unchanged only if the data contained in the first RFN BPDU is not redundant.

In the first RFN BPDU, the root link failure flag is set and the transmitting bridge's ID is set to the bridge ID of bridge 2 which is declaring itself as the new root bridge. The first RFN BPDU serves to inform all the bridges that bridge 2, which is announcing itself as the new root bridge, has lost its direct connection to the original root bridge 1. This notification does not presume that the root bridge 1 actually has failed. Rather, it is based solely on the fact that bridge 2 has lost its direct connection to root bridge 1, so that this notification would also be sent out if only the link $L_{12}$ between bridge 2 and the root bridge 1 fails.

Figure 1D:
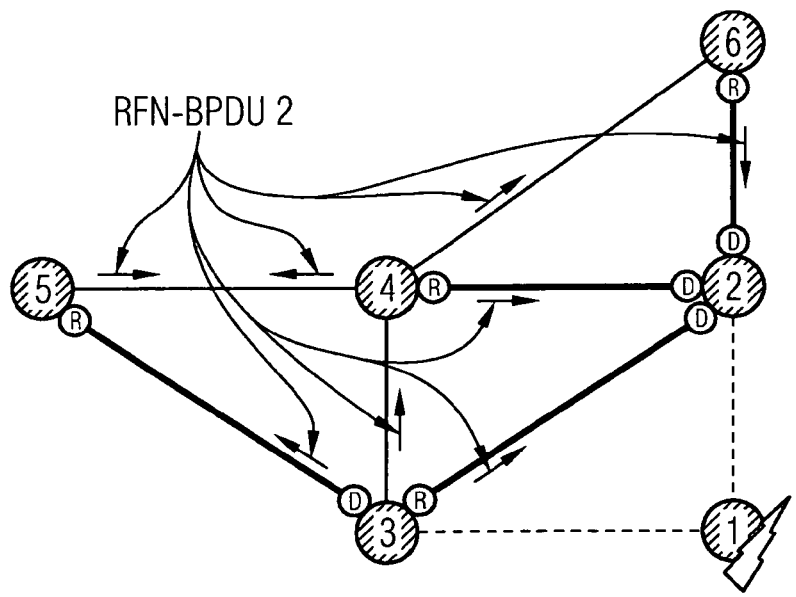

FIG. 1D shows a further temporary state of the communication network. In this network, bridge 3 has a direct connection to the old root bridge 1. Bridge 3 has a root port R which is connected to the root bridge 1, in which the "connected to root" flag is set, whereby this root port R has already failed because of the failure of the root bridge 1.

If bridge 3 has received and processed the RSTP BPDU or the first RFN BPDU within a predefinable time interval on the timer, it generates and transmits through all its ports a proprietary third configuration frame, namely a second RFN BPDU (RFN BPDU 2).

In this second RFN BPDU, the root-link-failure flag is cleared and the transmitting bridge ID is set to the bridge ID of the transmitting bridge 3. The second RFN BPDU informs all the other bridges that the old root bridge 1 has failed, on the basis of the fact that bridge 3 has lost its direct connection to the old root bridge 1 and in addition has received the RSTP BPDU or the first RFN BPDU with the root link failure flag set, by which bridge 3 was informed that another bridge (here bridge 2) has lost its direct connection to the old root bridge 1. The sending out of the second RFN BPDU is thus based on the assumption that when there is a failure of the links between the root bridge 1 and two bridges 2, 3, which were directly connected to the old root bridge 1, then root bridge 1 has failed.

The second RFN BPDU is received and processed by the other bridges in the network, thereby initiating a reconfiguration, with the determination based on RSTP of a new spanning tree. In addition, the data items contained in the second RFN BPDU are stored in the bridges. If another second RFN BPDU is received from the one and same bridge, the data contained in the second RFN BPDU which was received later is compared with the stored data from the second RFN BPDU which was received earlier. The receiving bridge will forward the second RFN BPDU unchanged only if the data contained in the second RFN BPDU is not redundant.

Each bridge which receives the second RFN BPDU routes it to all its ports, except for the port at which it received the second RFN BPDU. In addition, a restart of the bridge will be initiated, unless the bridge has already received and processed a second RFN BPDU with the same data.

Figure 1E:
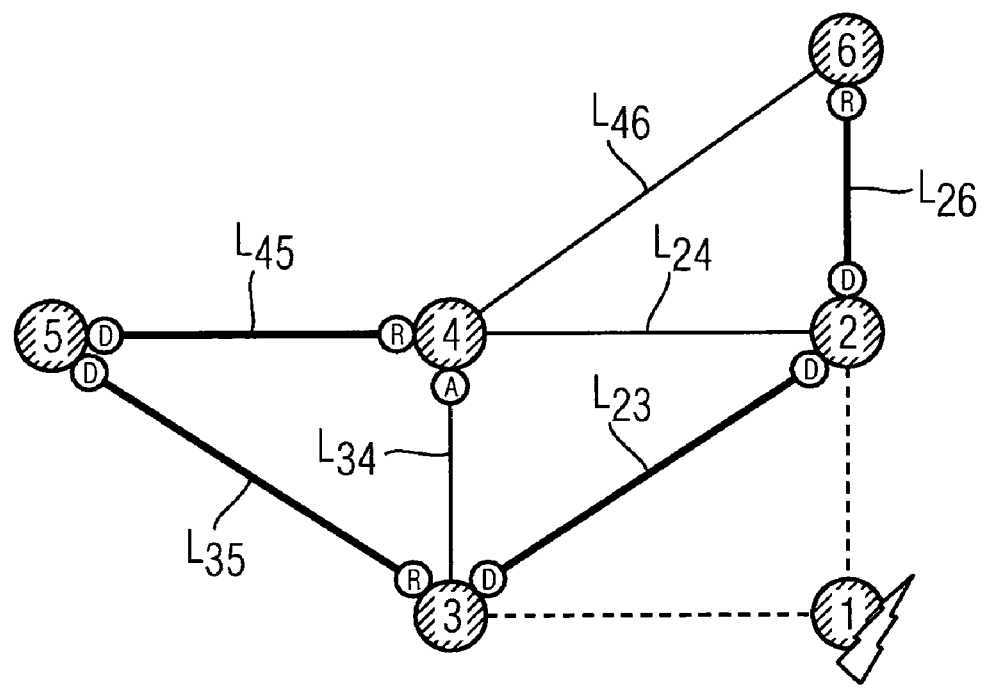

FIG. 1E shows a second stable state of the network, in which a second spanning tree containing all the bridges of the network has been stably set up after a reconvergence has been effected. The second spanning tree is shown by thicker lines in the network. In the second spanning tree, bridge 5 serves as the root bridge. The second spanning tree incorporates the links $L_{35}$ and $L_{45}$ for connecting the new root bridge 5 with the bridges 3 and 4, where the link $L_{35}$ connects together the designated port D of the new root bridge 5 and the root port R of bridge 3 and the link $L_{45}$ connects together the designated port D of the new root bridge 5 and the root port R of bridge 4. The second spanning tree incorporates in addition the link $L_{23}$ for connecting bridge 3 with bridge 2, where the link $L_{23}$ connects together the designated port D of bridge 3 and the root port R of bridge 2. It incorporates in addition the link $L_{26}$ for connecting bridge 2 with bridge 6, where the link $L_{26}$ connects together the designated port D of bridge 2 and the root port R of bridge 6. Data packets can be exchanged over this second spanning tree, which excludes the old root bridge, between bridges 2-6 of the communication network.

Figure 2:
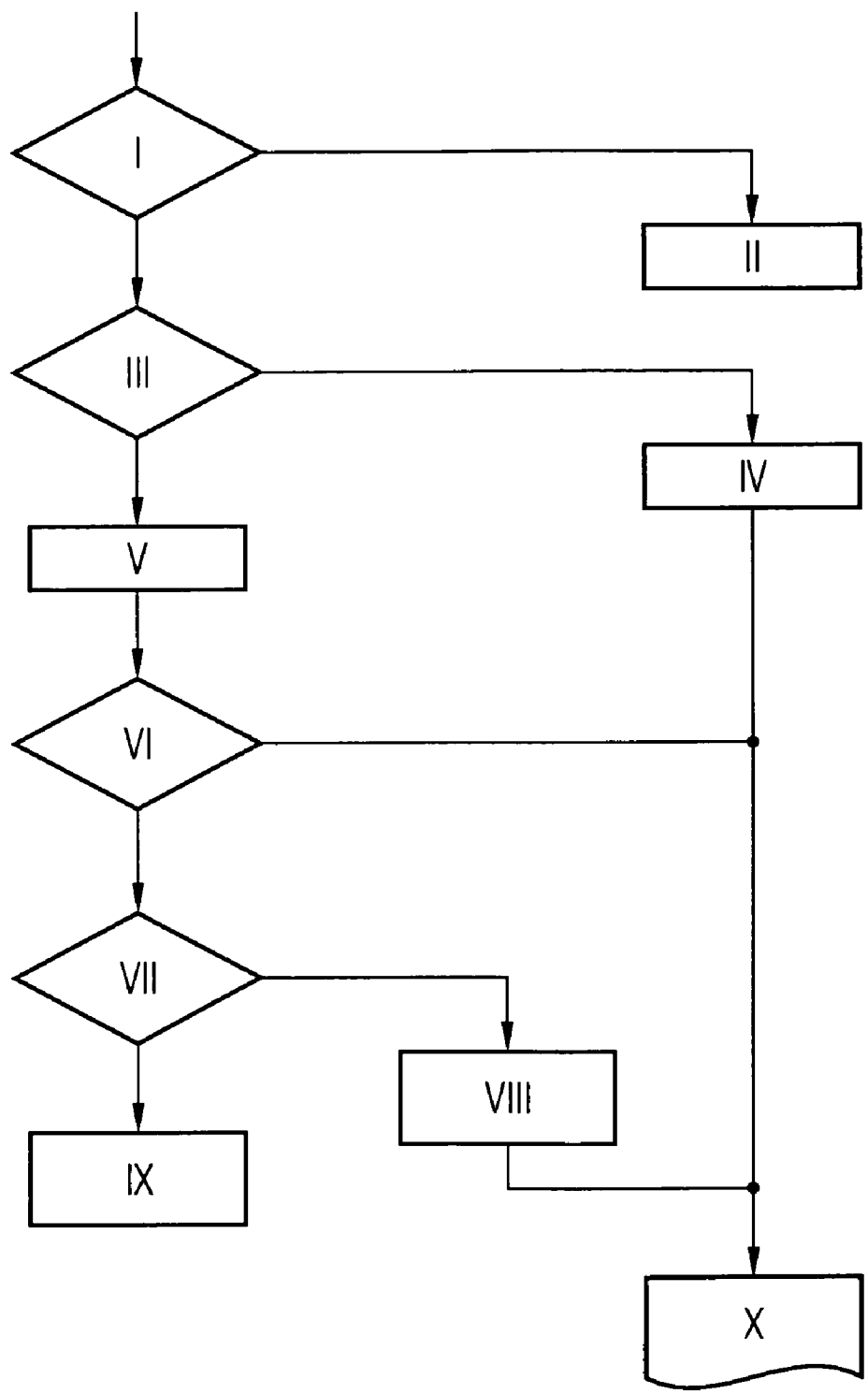
FIG. 2 a flow diagram to illustrate the processing of RSTP BPDUs in the method.

We refer now to FIG. 2, which shows a flow diagram to illustrate the processing of RSTP BPDUs by the bridges in FIG. 1.

After an RSTP BPDU has been received, step I first checks whether the RSTP BPDU bears a root bridge ID which corresponds to the bridge which failed most recently, and whether the timer T is running. If this applies, then the method proceeds to step II, and the RSTP BPDU is ignored by the bridge and discarded. If it does not apply, the method proceeds to step III, where a check is made as to whether the RSTP BPDU originates from the root bridge and whether it is not itself the bridge. If this last does not apply, the method proceeds to step IV, where the field "connected to root bridge" is set to "false". In the other case, the method proceeds to step V, where the field "connected to root bridge" in the configuration frame is set to "true". In this last case, the procedure then goes to step VI, where a check is made as to whether the data originates from the new root bridge and whether the data is new. If this does not apply, the method proceeds to step X, where the RSTP processing is continued. If this does apply, the method proceeds to step VII, where a check is made as to whether the failure is of a link which is directly connected to the root bridge. If this does apply, the method proceeds to step IX, where the "RFN received" field is set to "true" and the timer is started, in order to ignore the old root bridge, effect a restart and transmit a second RFN BPDU in which the "root link failure" flag is cleared. If this does not apply, the method proceeds to step VIII, in which a first RFN BPDU, with a root link failure flag which is set, is transmitted by all the ports except that at which the RSTP BPDU has been received. Following this, the method goes to step X, to resume the RSTP processing.

Figure 3:
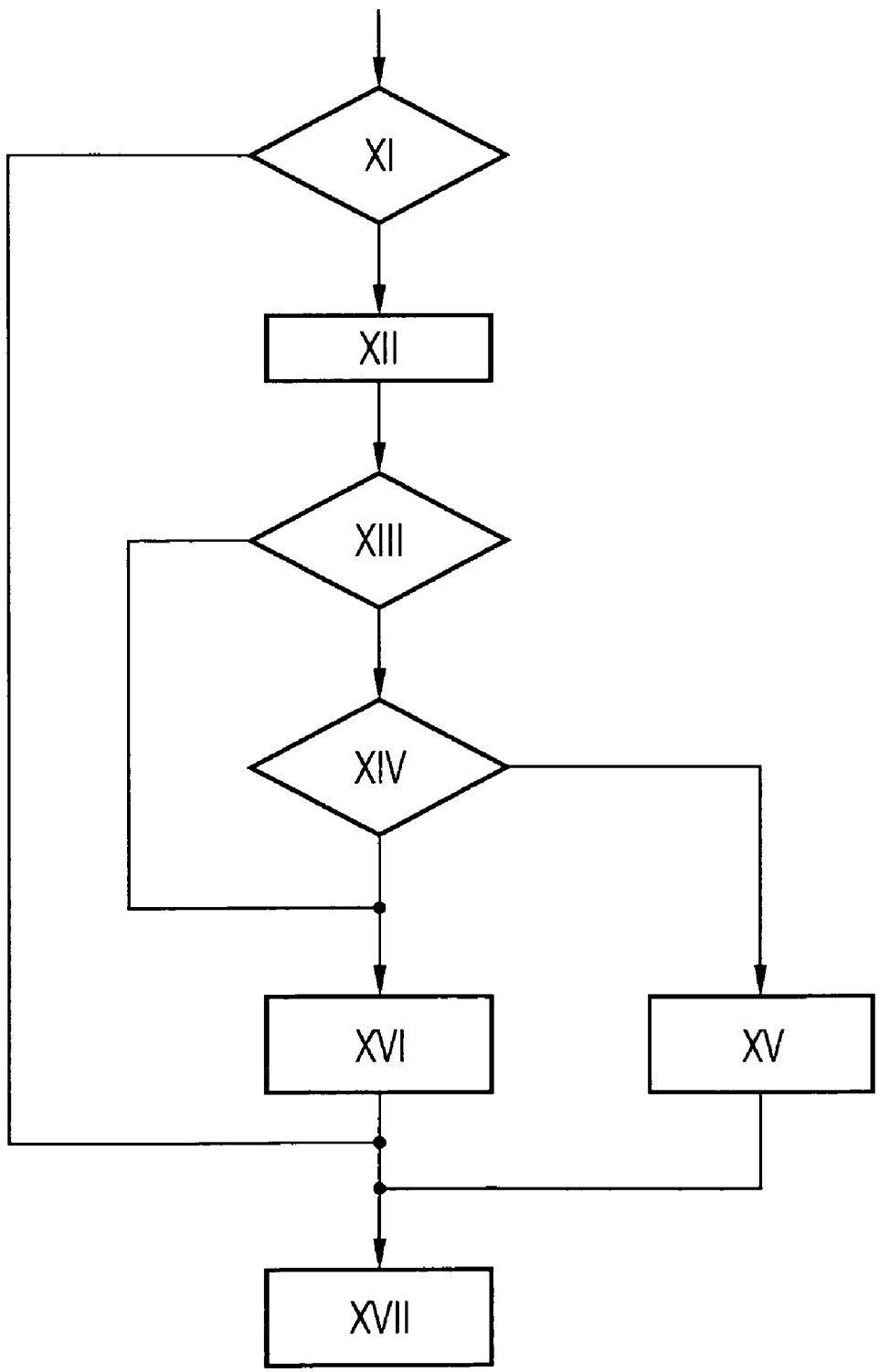
FIG. 3 a flow diagram to illustrate the processing of RFN BPDUs in the method.

We refer now to FIG. 3, in which is shown a flow diagram to illustrate the processing of RFN BPDUs in the bridges shown in FIG. 1.

After an RFN BPDU has been received, step XI first checks whether the data in the RFN BPDU is redundant. If the data in the RFN BPDU is redundant, the method proceeds to step XVII and the RFN BPDU is deleted. If the data in the RFN BPDU is not redundant, the method proceeds to step XII and the data in the RFN BPDU is stored. In this case, the method then proceeds to step XIII, where a check is made as to whether the root link failure flag is set in the RFN BPDU. If the root link failure flag is not set the method proceeds to step XVI, where the RFN received field is set to "true" and the timer is started, in order to ignore the old root bridge, effect a restart and transmit an RFN BPDU in which the "root link failure" flag is cleared. In this case, the procedure then goes to step XVII and the RFN BPDU is deleted. If it is the case that the root link failure flag is set in the RFN BPDU, the method proceeds to step XIV, where a check is made as to whether the failure is of a link which is directly connected to the root bridge. If the failure is of a link which is directly connected to the root bridge, the method proceeds to step XVI, where the RFN received field is set to "true" and the timer is started, in order to ignore the old root bridge, effect a restart and transmit an RFN BPDU in which the "root link failure" flag is cleared. In this case, the method then proceeds to step XVII and the RFN BPDU is deleted. If the failure is not of a link which is directly connected to the root bridge the method proceeds to step XV, where the RFN BPDU which was received is forwarded to all the other ports. In this last case, the procedure then goes to step XVII and the RFN BPDU is deleted.

In the method detection of the failure of a root bridge is based on the fact that all the direct links to the root bridge fail if the root bridge fails. This will be detected by all the bridges which are directly connected to the root bridge. It is here assumed that all the bridges are in a position to detect a failure in the MAC layer (layer 2 of the OSI model) on the other side of the link, for example due to the failure of the bridge at the other end of the link. All the bridges in the network are informed of the failure of a connection to the root bridge as soon as this is detected by a bridge. A bridge which detects a failure of the root bridge or of a direct link to the root bridge transmits a new proprietary BPDU (RFN BPDU) in order to inform the other bridges in the network of this. The path costs will depend on the particular situation. A bridge which receives the RFN BPDU processes it, clears all its states, if necessary effects a restart, and if necessary forwards the RFN BPDU to all its ports except for that port at which it was received. The processing of an RFN BPDU which is received depends on whether an RFN BPDU which contains the same data has previously already been received and processed. This is achieved by storing in each bridge the data from the RFN BPDUs which have been received. A bridge which is directly connected to the root bridge and has no alternative ports declares itself as the new root bridge, as soon as the root bridge fails, in that it transmits BPDUs with its own bridge ID as the root bridge ID. A bridge which is directly connected to the root bridge and which has at least one alternative port changes one alternative port to be the root port as soon as the root bridge fails. A root bridge is declared to have failed if a bridge which is directly connected to the root bridge detects a failure of the link to the root bridge and receives at one of its ports either an RFN BPDU or an RSTP BPDU which bears a new bridge ID. In other words, a root bridge is declared to have failed if a bridge detects the local failure of a link to the root bridge and in addition receives a note that another bridge has also lost its direct connection to the root bridge (via either an RFN BPDU or an RSTP BPDU which bears a new root bridge ID). Each bridge monitors its local ports which are directly connected to the root bridge in that the RSTP BPDUs at each port are monitored.

The invention is in addition based on the fact that a bridge can monitor local ports which are directly connected to the root bridge. This is only possible if point-to-point connections are used between the bridges. After the restoration of a root bridge which had failed, all the bridges will automatically accept the restored bridge, which announces itself as the new root bridge, whereby the network convergence time is in the millisecond range, as expected by the RSTP standard. The invention has no detrimental effect on this scenario. The TXHoldCount parameter should be set to at least 5, in order to maximize the BPDU transmission, in particular during network convergence.

A particular advantage of the invention is the rapid network reconfiguration after a failure of the root bridge. As simulations have shown, the convergence times lie very close to the convergence times during a network startup. For a network with 16 bridges, the convergence time is approx. 16-18 milliseconds. Another advantage lies in the fact that when the old root bridge is restored the convergence time is only about 9-10 milliseconds.

The invention claimed is:

1. A method for reconfiguring a packet-switched communication network which uses a network protocol by which a logical topology is set up for the network in the form of a spanning tree, comprising:
   detecting a failure of a direct link to a root bridge of the spanning tree by a first bridge which is directly connected to the root bridge via a link and has no alternative ports;
   starting of a timer;
   detecting, within a selectable interval of time on the timer, the failure of the direct link to the root bridge by a second bridge which is directly connected to the root bridge via the link and has alternative root ports;
   transmitting a first configuration frame generated by the first bridge to the other bridges of the network, the first configuration frame containing as a origin identifier a identifier of the first bridge;
   receiving the first configuration frame by a third bridge;
   transmitting a second configuration frame generated by the third bridge to the other bridges of the network, where a flag indicating the failure of the direct link from the first bridge to the root bridge is set in the second configuration frame, the second configuration frame containing as a origin identifier the identifier of the first bridge;
   detecting the first or second configuration frame by the second bridge;
   transmitting a third configuration frame generated by the second bridge to the other bridges of the network, where the flag indicating the failure of the direct link from the first bridge to the root bridge is cleared in the third configuration frame, the third configuration frame containing as a origin identifier a identifier of the second bridge;
   receiving the third configuration frame by the other bridges of the network; and
   initiating a reconfiguration of the network with a determination of a new spanning tree using the network protocol.

2. The method as claimed in claim 1, wherein a configuration frame transmitted by the root bridge is not processed within a selectable interval of time on the timer by the other bridges of the network.

3. The method as claimed in claim 1, wherein the network protocol is based on the Spanning Tree Protocol as per IEEE Standard 802.1d.

4. The method as claimed in claim 2, wherein the network protocol is based on the Spanning Tree Protocol as per IEEE Standard 802.1d.

5. The method as claimed in claim 1, wherein the network protocol is based on the Rapid Spanning Tree Protocol as per IEEE Standard 802.1w.

6. The method as claimed in claim 2, wherein the network protocol is based on the Rapid Spanning Tree Protocol as per IEEE Standard 802.1w.

7. The method as claimed in claim 1, wherein the network protocol is based on the Multiple Spanning Tree Protocol as per IEEE Standard 802.1s.

8. The method as claimed in claim 2, wherein the network protocol is based on the Multiple Spanning Tree Protocol as per IEEE Standard 802.1s.

9. A non-transitory computer readable medium encoded with instructions which, when executed by a computer, perform a method for reconfiguring a packet-switched communication network which uses a network protocol by which a logical topology is set up for the network in the form of a spanning tree, the method comprising:
   detecting a failure of a direct link to a root bridge of the spanning tree by a first bridge which is directly connected to the root bridge via a link and which has no alternative ports;
   starting of a timer;
   detecting, within a selectable interval of time on the timer, the failure of the direct link to the root bridge by a second bridge which is directly connected to the root bridge via the link and which has alternative root ports;
   transmitting a first configuration frame generated by the first bridge to the other bridges of the network, the first configuration frame containing as its origin identifier a identifier of the first bridge;
   receiving the first configuration frame by a third bridge;
   transmitting a second configuration frame generated by the third bridge to the other bridges of the network, where a flag indicating the failure of the direct link from the first bridge to the root bridge is set in the second configuration frame, the second configuration frame containing as its origin identifier the identifier of the first bridge;
   detecting the first or second configuration frame by the second bridge;
   transmitting a third configuration frame generated by the second bridge to the other bridges of the network, where the flag indicating the failure of the direct link from the first bridge to the root bridge is cleared in the third configuration frame, the third configuration frame containing as its origin identifier a identifier of the second bridge;
   receiving the third configuration frame by the other bridges of the network; and
   initiating a reconfiguration of the network with a determination of a new spanning tree using the network protocol.

10. The computer readable medium as claimed in claim 9, wherein a configuration frame transmitted by the root bridge is not processed within a selectable interval of time on the timer by the other bridges of the network.

11. The computer readable medium as claimed in claim 9, wherein the network protocol is based on the Spanning Tree Protocol as per IEEE Standard 802.1d.

12. The computer readable medium as claimed in claim 9, wherein the network protocol is based on the Rapid Spanning Tree Protocol as per IEEE Standard 802.1w.

13. The computer readable medium as claimed in claim 9, wherein the network protocol is based on the Multiple Spanning Tree Protocol as per IEEE Standard 802.1s.

* * * * *